United States Patent [19]

Lazzarini

[11] 4,152,977
[45] May 8, 1979

[54] STEMMING AND PEELING APPARATUS

[75] Inventor: Louis P. Lazzarini, San Jose, Calif.

[73] Assignee: Genevieve I. Hanscom, Robert Magnuson and Lois J. Thompson, as Trustees of the Estate of Roy M. Magnuson, all of San Jose, Calif. ; part interest to each

[21] Appl. No.: 857,383

[22] Filed: Dec. 5, 1977

[51] Int. Cl.² ............................................. A23N 15/02
[52] U.S. Cl. ........................................................ 99/640
[58] Field of Search ........................... 99/635, 636–638, 99/640; 117/94

[56] References Cited

U.S. PATENT DOCUMENTS

| | | | |
|---|---|---|---|
| 2,707,982 | 5/1955 | Magnuson | 99/640 |
| 2,835,295 | 5/1958 | Magnuson | 99/640 |
| 2,997,085 | 8/1961 | Magnuson | 99/640 |
| 3,642,520 | 2/1972 | Lazzarini | 117/94 |
| 3,747,515 | 7/1973 | Pertics | 99/640 |

*Primary Examiner*—Leonard D. Christian
*Attorney, Agent, or Firm*—Gerald L. Moore

[57] ABSTRACT

Apparatus for stemming or peeling produce such as cherries and tomatoes comprising a plurality of roll beds with adjacent rolls thereon being power rotated in opposite directions. The beds are positioned with the rolls in a horizontal plane such that the produce articles will proceed from one bed to the next in an upstream to downstream direction. The downstream beds are positioned slightly below those upstream thereof and the beds are oscillated back and forth in the direction of article travel so that the produce tumbles from one bed to the next to bring all surfaces thereof into contact with the rotating rollers.

6 Claims, 7 Drawing Figures

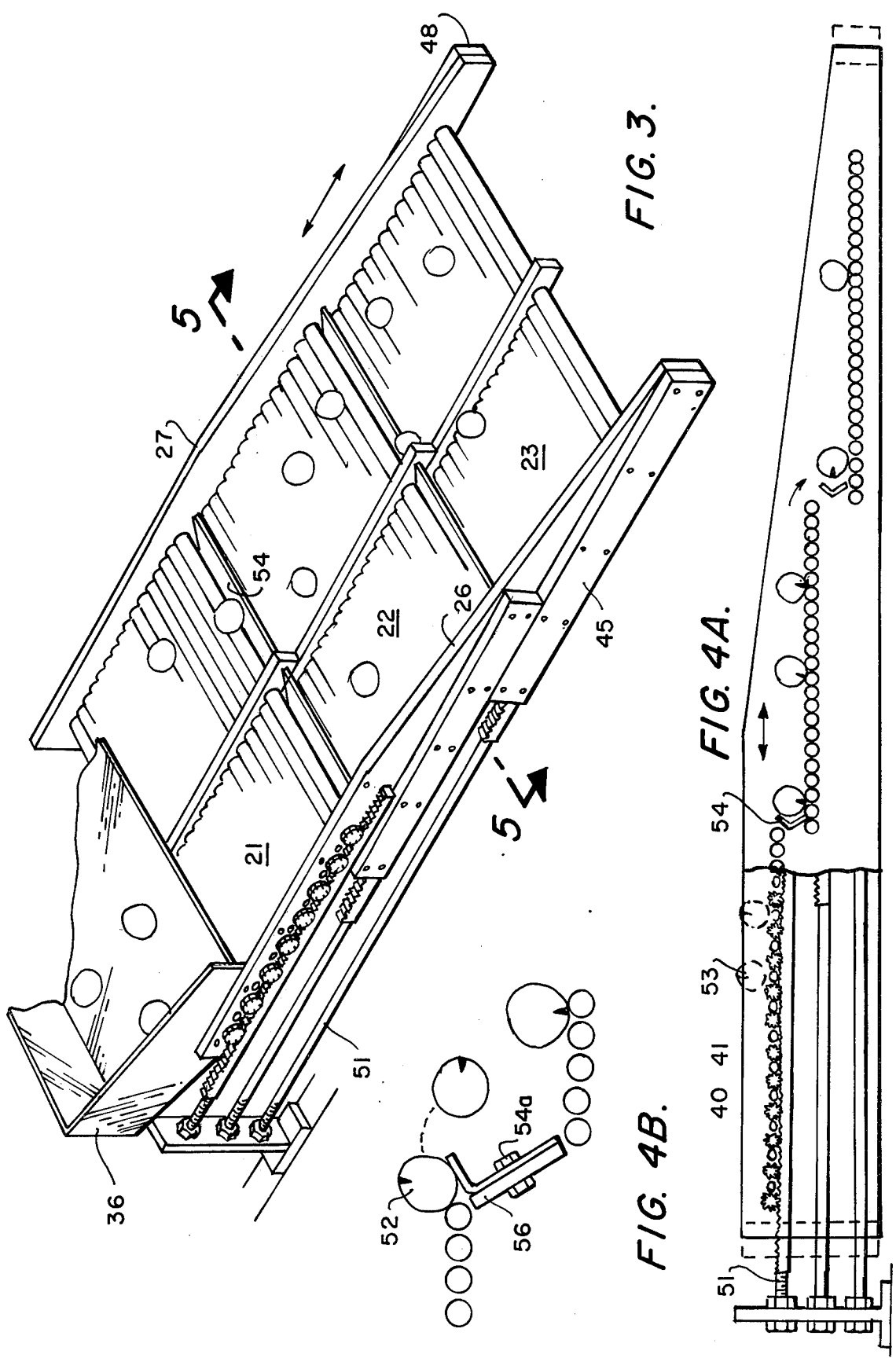

STEMMING AND PEELING APPARATUS

RELATED PATENTS

U.S. Pat. No. 2,707,982—Olive Stemming Apparatus issued on May 10, 1955, with R. Magnuson as inventor.

U.S. Pat. No. 2,835,295—Stemming Apparatus issued on May 20, 1958, with R. Magnuson as inventor.

BACKGROUND OF THE INVENTION

In peeling or destemming produce such as tomatoes, cherries, olives and the like, it is common practice to pass the produce across beds of power rotated rolls as disclosed in the above-identified patents. In such apparatus the rolls, in being rotated in opposite directions, catch the stem or peel and pull it from the produce body. Since the article body is large in comparison to the space between the rolls the articles tend to ride across the top or upper surfaces of the rolls.

By oscillating the roll beds back and forth in the direction of travel of the articles, the articles preferably are caused to roll so as to bring all sides thereof into contact with the turning rolls. By so doing it is hoped that the peel or stems are removed from the produce.

However experience has shown that the oscillatory motion of the beds tends to clump or group the articles together to limit the rolling action of the product. In addition, articles which have gone through a caustic solution for loosening the peel tend to become oblong or irregularly shaped and thereby roll less as they move across the top surfaces of the rolls. Because of these effects and the fact that some product is naturally oblong in configuration with the stems extending along the longitudinal axis so as not to readily come into contact with the rolls, such apparatus sometimes is less than totally successful in removing the peel and stems from all of the articles. As a result it is the object of this invention to limit the amount of bunching or grouping of the articles and also to cause a greater rolling action so as to increase the possibilities of all surfaces coming into contact with the rolls for better peeling or stemming operation.

SUMMARY OF THE INVENTION

An apparatus for stemming or peeling produce comprising a plurality of roll beds each supporting a plurality of rolls positioned in a single substantially horizontal plane. The rolls are power driven so that alternate ones rotate in opposite directions with means to introduce produce to be peeled or stemmed at one edge of one bed so as to proceed across the tops of each of the beds in succession. Drive means for causing the beds to oscillate back and forth as the rolls are turned cause the articles to proceed thereacross. The individual beds are positioned above the next bed downstream so as to cause the produce to tumble as it passes from one bed to the next thereby increasing the rolling action of the articles so that all surfaces thereof will come in contact with the rolls.

DESCRIPTION OF THE DRAWINGS

FIG. 3 is a perspective view of the roll beds showing articles passing across the rolls;

FIGS. 4A and 4B show the action of the articles as they pass from one bed to another;

DESCRIPTION OF THE INVENTION

Figure 1:
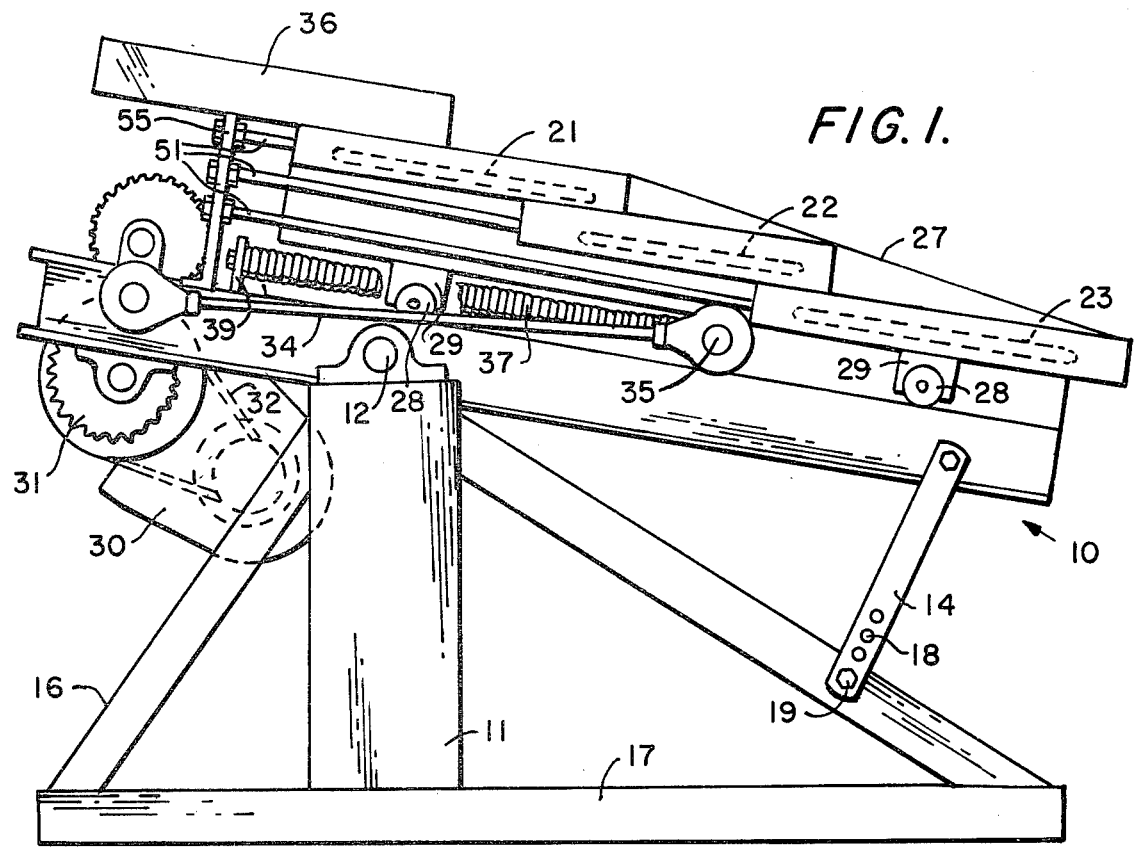
FIG. 1 is a side elevational view of the apparatus incorporating the subject invention.
Figure 2:
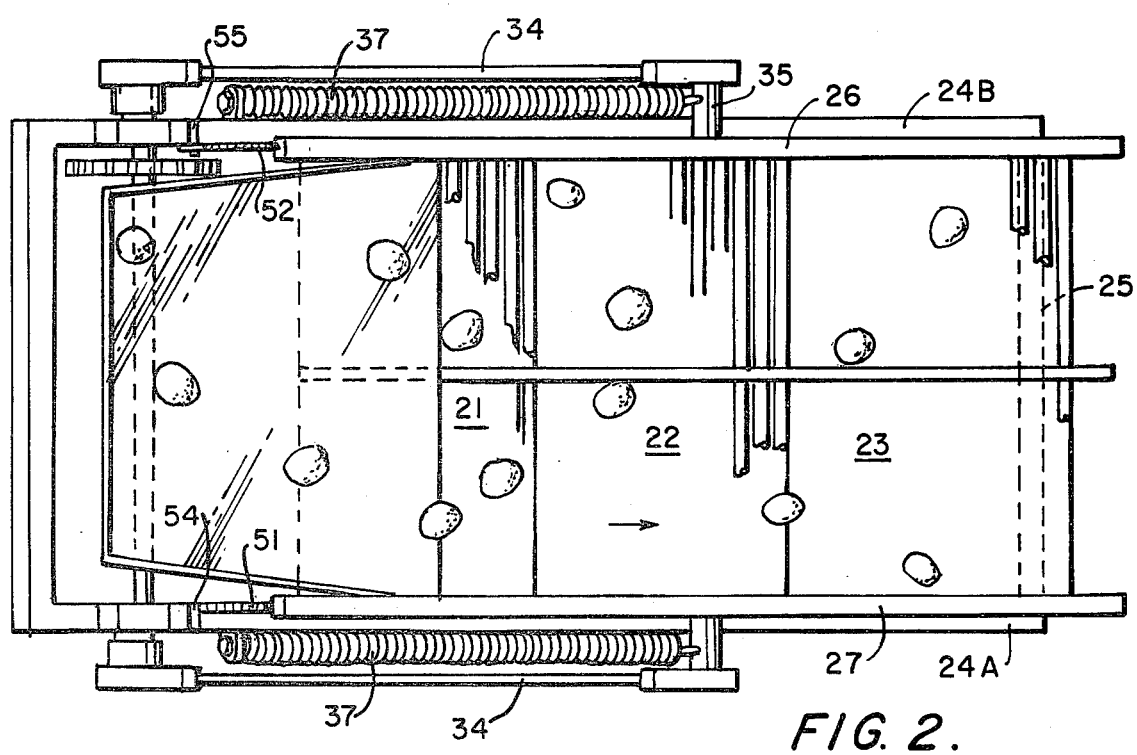
FIG. 2 is a top view of the apparatus of FIG. 1.

With reference primarily to FIGS. 1, 2 and 3, therein is shown a stemmer or peeling apparatus including a rectangular support 10 pivotally mounted on legs 11 by trunnions 12 adjacent one end thereof and at the other end by a pair of adjustably mounted support arms 14 extending down to a diagonal frame member 15. The legs 11, 15 and an additional diagonal member 16 on each side of the frame extend down to a base 17 which rests on the floor. The support arm 14 includes a plurality of holes 18 through which a bolt 19 can be passed to fasten the lower end of this support to the diagonal brace 15 thereby changing the attitude of the support 10 for reasons to be explained later.

In accordance with the present invention there is provided a plurality of roll beds 21, 22 and 23 supported for oscillatory movement on the support 10. The frame member 10 includes side support members 24A and 24B in parallel spaced relationship and connected by cross member 25 (FIG. 2) to form a box structure. The roll beds 21, 22 and 23 are mounted between a pair of side frame members 26 and 27 which extend above and parallel to the frame members 24A and 24B. Supporting each side frame member 26 and 27 is a pair of rollers 28 journaled on flanges 29 fixed to the bottom thereto so that the rollers ride on the top surface of the side support members 24A and 24B. The roll beds in being supported on the rollers 28 are permitted to oscillate in unison back and forth along the top edge of the frame 10. To effect such movement there is fixed to the frame 10 a drive motor 30 driving an eccentric 31 through a belt 32 to which is journaled a connecting rod 34 extending to the shaft 35 connected to the side frame members 26 and 27. Thus by driving the motor 30, the eccentric 31 is rotated to cause the connecting rods 34 to oscillate back and forth and drive with them the side frame members 26 and 27 carrying the roll beds 21, 22 and 23. The product to be stemmed or peeled is introduced onto a feed chute 36 having an extending end fixed over the first or upstream roll bed 21 so that the articles fall from the chute onto that roll bed. Because of the tilting of the support 10 through the adjustment of the support 14, the articles tend to move from the roll bed 21 to the roll bed 22 and onto the roll bed 23. The oscillatory motion of the roll beds facilitates this movement from the upstream roll bed 21 to the downstream roll bed 23.

To assist in returning the roll beds upward along the support 10, a pair of springs 37 extend between the shaft 35 on the roll bed frame and a flange 39 fixed to the support 10. Thus on the downward or forward movement of the roll bed these springs are extended, i.e., to the right in FIG. 1, so as to assist in the reverse or upward movement thereof and aid in maintaining an even load on the drive.

Figure 5:
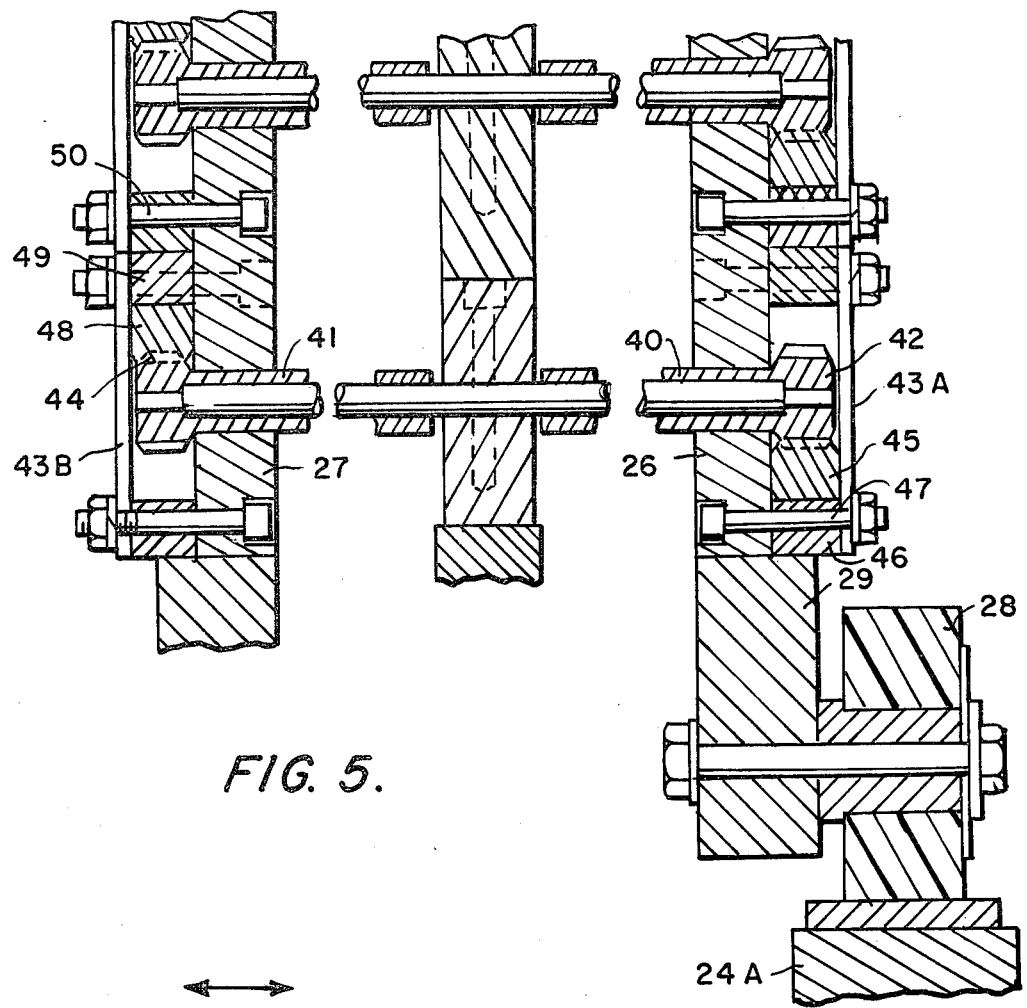
FIG. 5 is an enlarged and compressed sectional view of the rolls and roll supports showing the drive means for the rolls and the support for the roll beds.
Figure 6:
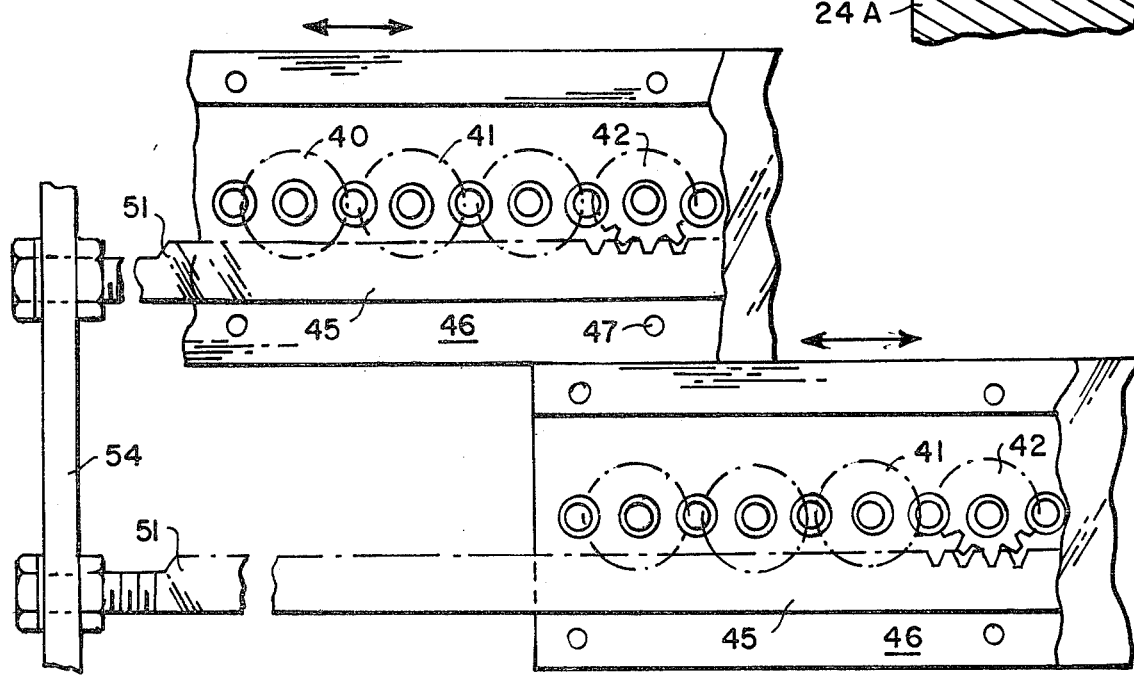
FIG. 6 is a side view showing a portion of the drive means for the rolls.

The roll beds 21, 22 and 23 each include a plurality of rolls 40 and 41 alternately positioned in a single plane so that the articles contact the top surfaces of these rolls. These rolls are also rotated in opposite directions with the oscillatory movement of the roll beds. For this purpose each roll 40 of the roll beds includes a gear 42 at one end (see FIG. 5) while the rolls 41 each include a gear 44 at the opposite ends. The gears 42 mesh with a rack gear 45 resting on a support 46 bolted to the side frame member 26 by the bolt 47. Similarly a rack gear 48 meshes with the gears 44 and is held in place by a support 49 bolted in place by the bolt 50 to the side frame member 27. Cover plates 43A and 43B are bolted over the gears.

Fixed to the ends of the rack gears 45 and 48 are rods 51 and 52 (see FIG. 2) for each roll bed having the other ends fixed by nuts to flanges 54 and 55 fixed to the top edge of the side support members 24A and 24B, respectively. Thus as the side frame members 26 and 27 are moved back and forth to impart an oscillatory motion to the roll beds 21, 22 and 23, the adjacent rolls 40 and 41 are rotated in opposite directions. As indicated in FIG. 4A, the articles 52 passing across the tops of the roll beds thus rest on the tops of the rolls 40 and 41 which are turning in opposite directions so that peel or stems on the articles will be grasped between adjacent rolls and be pulled from the article. Because the rolls are positioned closely together the articles themselves do not fall between the rolls but instead ride across the roll top surfaces as the stems and peel is separated therefrom.

As discussed previously the oscillatory movement in conjunction with the opposite rotation of the rolls 40 and 41 tend to group or clump the articles together in close contact in a manner to limit any rolling action imparted thereto by the rolls on which they rest. In order to limit such clumping or grouping of the articles the roll beds 22 and 23 are positioned each below the next adjacent upstream bed in a tiered configuration so that the product tumbles from the feed chute 36 as shown in FIG. 3 onto the roll bed 21 and thereafter tumbles onto the roll bed 22 to subsequently tumble onto the roll bed 23. This tumbling action causes the articles to be separated and to turn over with the result that more sides of the articles are exposed to the support rolls for a more efficient removal of the stems or peels.

To facilitate the rolling action of the product moving from the upstream higher roll bed to the lower roll bed there are fastened to the downstream edges of each roll bed a flange 54 (FIGS. 3, 4A and 4B) which is bolted by bolts 54A to a connecting member 56 extending between the side frame members 26 and 27 of each roll bed. Each flange extends in an upward and downstream direction from the bed to which it is attached. These flanges tend to flip the articles 53 in the manner shown in FIG. 4B so as to impart a greater rotative action thereto while separating the individual articles. Thus it can be seen that as the articles proceed from roll bed to roll bed any groupings thereof are better separated and the articles are rotated in a more efficient manner to assure that all surface areas come into contact with the supporting rolls.

The invention claimed is:

1. Apparatus for stemming and peeling produce such as cherries and tomatoes comprising, in combination:
    a plurality of beds of parallel adjacent stemming rolls, said beds being positioned side-by-side to carry produce introduced at the upstream side across the beds in consecutive order in a downstream direction normal to the axis of rotation of the rolls;
    means for moving said beds back and forth in a direction parallel to the desired path of movement of the produce from the upstream side to the downstream side;
    means for effecting rotative movement of said rolls with adjacent rolls being rotated in opposite directions so that the produce in being introduced on the upstream bed will progress in the downstream direction with the back and forth movement of the beds with the adjacent rolls catching and pulling the stems and peel therefrom; and
    means mounting said beds with each downstream bed positioned slightly below the next adjacent upstream bed so the produce will tumble and roll as it falls from bed to bed thereby increasing the rolling action of the produce.

2. Apparatus as defined in claim 1, including a flange fixed to each bed at its downstream bed to contact and roll the produce passing thereacross.

3. Apparatus as defined in claim 2, wherein said flange extends in a direction upward and downstream from the bed edge to which it is attached.

4. Apparatus for stemming and peeling produce such as cherries and tomatoes, comprising, in combination:
    a plurality of beds of parallel adjacent stemming rolls, said beds being positioned side-by-side on a frame to form a top surface for carrying produce introduced at the upstream side across the beds in consecutive order in a downstream direction and normal to the axis of rotation of the rolls;
    a support having a pair of side support members mounted in parallel spaced relationship;
    a plurality of rollers journaled on said frame and positioned to ride on said support members to allow oscillatory movement of said beds;
    power drive means for rotating adjacent rolls in opposite directions;
    drive means for moving said frame back and forth relative to said support;
    said beds being mounted on said frame with each downstream bed being positioned at a slightly lower level than the next adjacent upstream bed whereby with rotation of the rolls and oscillatory movement of the frame the produce is caused to move across the beds and tumble from one bed to the next.

5. Apparatus as defined in claim 4, including means to tilt said support to control the flow of produce from the upstream to the downstream side of said beds.

6. Apparatus for stemming and peeling produce such as cherries and tomatoes, comprising in combination:
    a plurality of beds positioned in side-by-side relationship on a frame each forming a top surface for carrying produce from an upstream side in a downstream direction across the beds in consecutive order;
    means formed in the bed top surfaces to grip the contacting surface of the produce and remove a portion thereof;
    drive means for oscillating the frame back and forth in the upstream-downstream direction to roll the produce and cause movement thereof towards the downstream direction; and
    said beds being mounted on said frame with each downstream located bed being positioned at a slightly lower level than the next adjacent upstream bed thereby to increase the rolling action of the produce tumbling from bed to bed and bring more area thereof into contact with the bed top surfaces.

* * * * *